United States Patent [19]
Omura

[11] Patent Number: 5,398,185
[45] Date of Patent: Mar. 14, 1995

[54] SHOCK ABSORBING INTERIOR SYSTEM FOR VEHICLE PASSENGERS

[75] Inventor: Hideo Omura, Kanagawa, Japan

[73] Assignee: Nissan Motor Co., Ltd., Yokohama, Japan

[21] Appl. No.: 13,481

[22] Filed: Jan. 28, 1993

Related U.S. Application Data

[63] Continuation of Ser. No. 685,956, Apr. 17, 1991, abandoned.

[30] Foreign Application Priority Data

Apr. 18, 1990 [JP] Japan .................. 2-100218

[51] Int. Cl.6 ............... B60R 21/32; B60R 21/00
[52] U.S. Cl. ............... 364/424.05; 180/268; 180/282; 280/735; 280/753; 307/10.1
[58] Field of Search ............ 364/424.05, 424.01; 307/10.1; 340/436; 180/268, 282; 280/730, 734, 735, 753, 806; 348/143, 148

[56] References Cited

U.S. PATENT DOCUMENTS

| 4,381,829 | 5/1983 | Montaron | 180/274 |
|---|---|---|---|
| 4,625,329 | 11/1986 | Ishikawa et al. | 382/1 |
| 4,655,312 | 4/1987 | Frantom et al. | 180/268 |
| 4,738,485 | 4/1988 | Rumpf | 280/806 |
| 4,948,168 | 8/1990 | Adomeit et al. | 280/730 |
| 4,951,963 | 8/1990 | Behr et al. | 280/753 |
| 4,985,835 | 1/1991 | Sterler et al. | 364/424.05 |
| 5,036,467 | 7/1991 | Blackburn et al. | 364/424.05 |
| 5,065,322 | 11/1991 | Mazur et al. | 364/424.05 |
| 5,071,160 | 12/1991 | White et al. | 180/282 |
| 5,074,583 | 12/1991 | Fujita et al. | 280/735 |
| 5,083,276 | 1/1992 | Okano et al. | 307/10.1 |

FOREIGN PATENT DOCUMENTS

| 0210079 | 1/1987 | European Pat. Off. | 280/735 |
|---|---|---|---|
| 2537212 | 3/1977 | Germany . | |
| 3514178 | 10/1986 | Germany . | |
| 3802159A1 | 1/1988 | Germany . | |
| 3737554 | 5/1989 | Germany . | |
| 3809074 | 10/1989 | Germany . | |
| WO90/03902 | 4/1990 | WIPO . | |

Primary Examiner—Michael Zanelli
Attorney, Agent, or Firm—Lowe, Price, LeBlanc & Becker

[57] ABSTRACT

An interior system for an automotive vehicle comprises interior elements, actuators for the interior elements, and sensors. When a vehicle collision data reveals a vehicle collision, a passenger's behavior is estimated in response to passenger data and first vehicle data collected, and a second vehicle data stored. A characteristic value of each interior element is computed in a manner to minimize an impact to a passenger in accordance with the passenger's behavior estimated. Then, the actuators are controlled in response to the characteristic value computed.

11 Claims, 17 Drawing Sheets

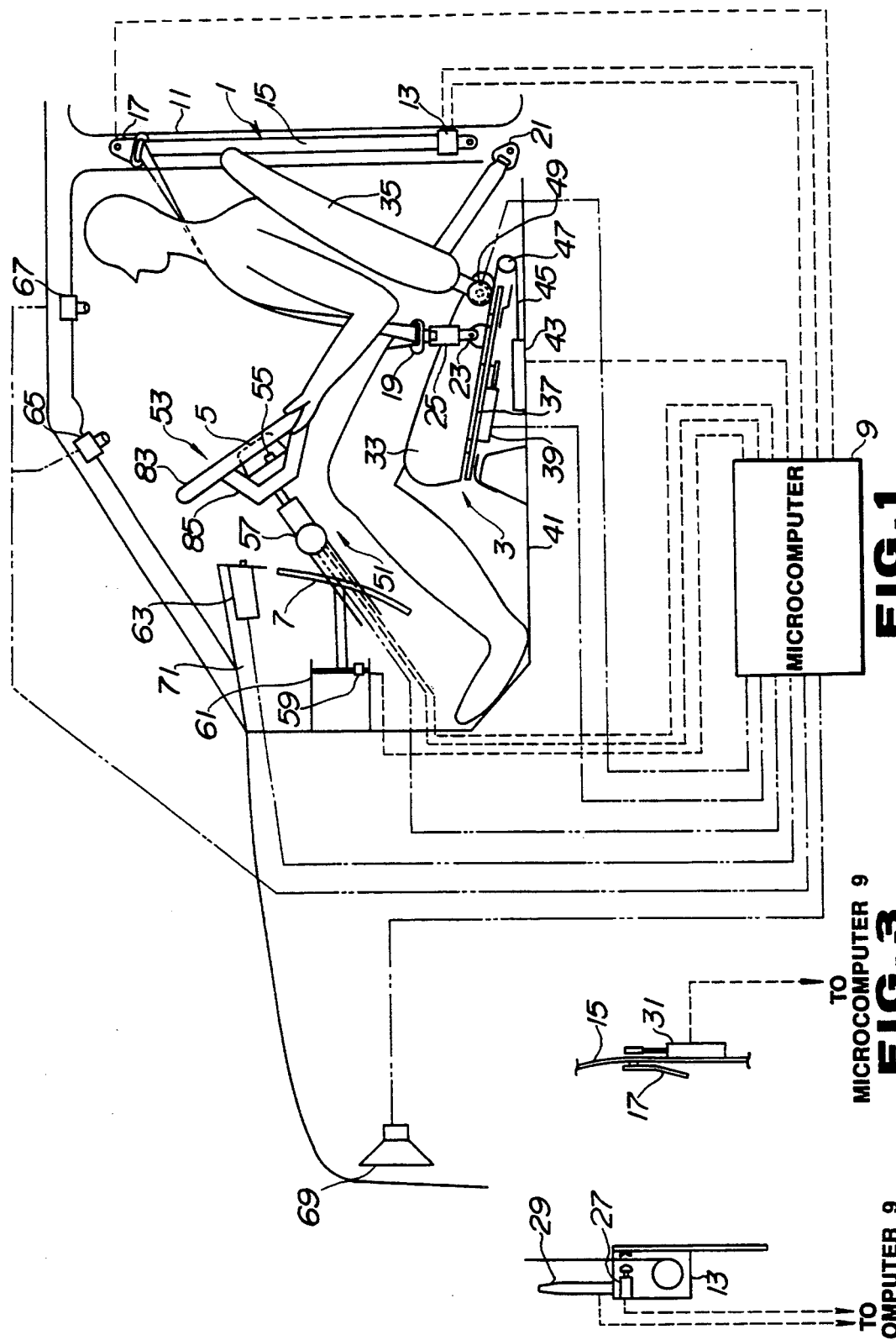

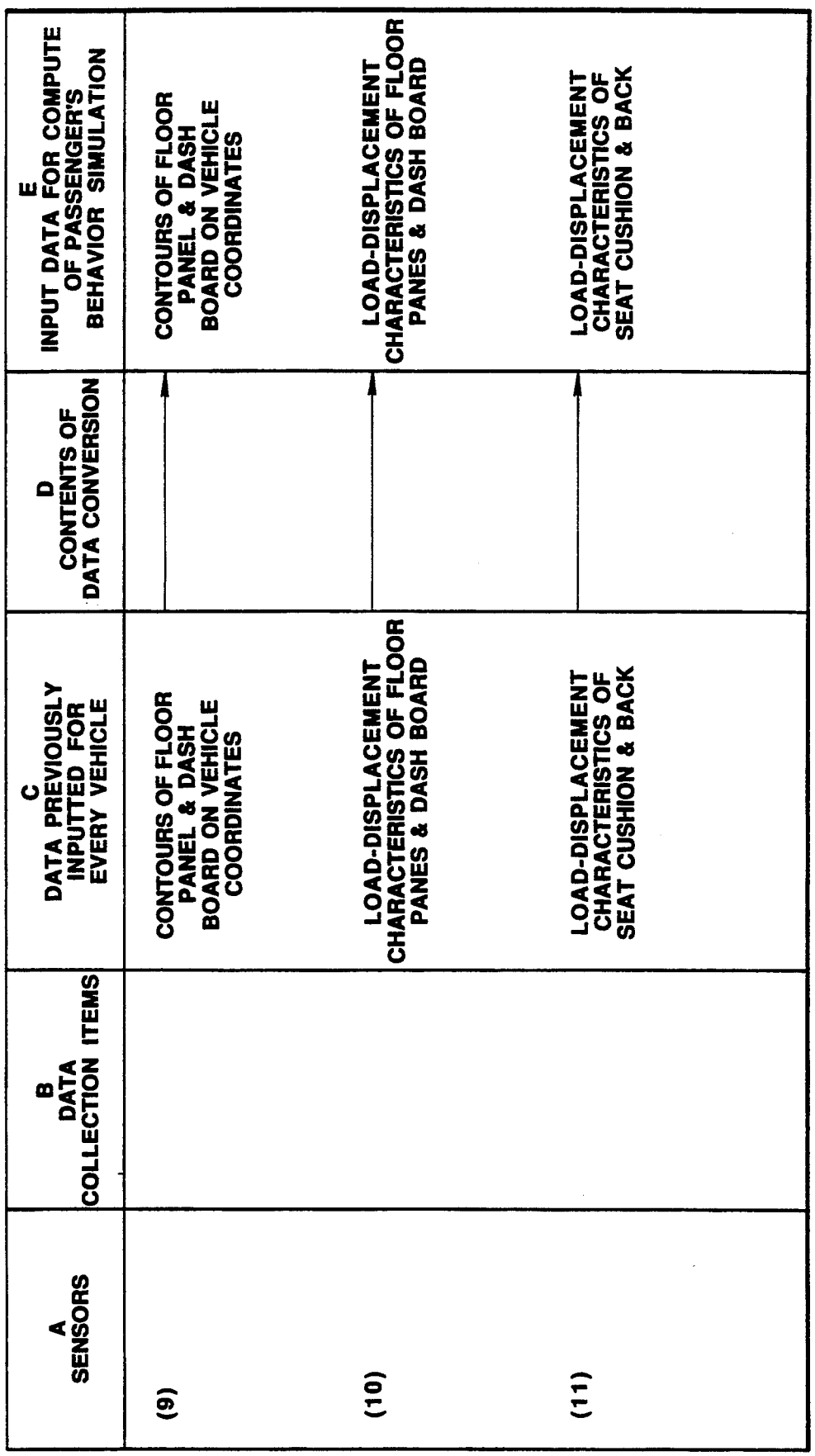

| CHARACTERISTIC VALUES FOR MINIMIZING SHOCK TO PASSENGER BASED ON COMPUTE OF PASSENGER'S BEHAVIOR SIMULATION | MEANS&DEVICES FOR ACHIEVING THE CHARACTERISTICS IN LEFT COLUMN |
|---|---|
| (1) SEAT BELT LOAD -DISPLACEMENT CHARACTERISTIC | · ADJUSTABLE CLAMP FORCE ELR<br>· ELR INTEGRATED WITH PRELOADER |
| (2) SHOULDER ANCHOR POSITION | · PRELOADER |
| (3) AIR BAG INTERNAL PRESSURE | · VARIABLE SET PRESSURE TYPE PRESSURE VALVE |
| (4) AIR BAG IGNITION TIME | · IGNITION SIGNAL CIRCUITRY |
| (5) KNEE PROTECTOR LOAD-DISPLACEMENT CHARACTERISTIC | · ADJUSTABLE ORIFICE DIAMETER DAMPER |
| (6) SEAT POSITION | · PRELOADER |

FIG. 6

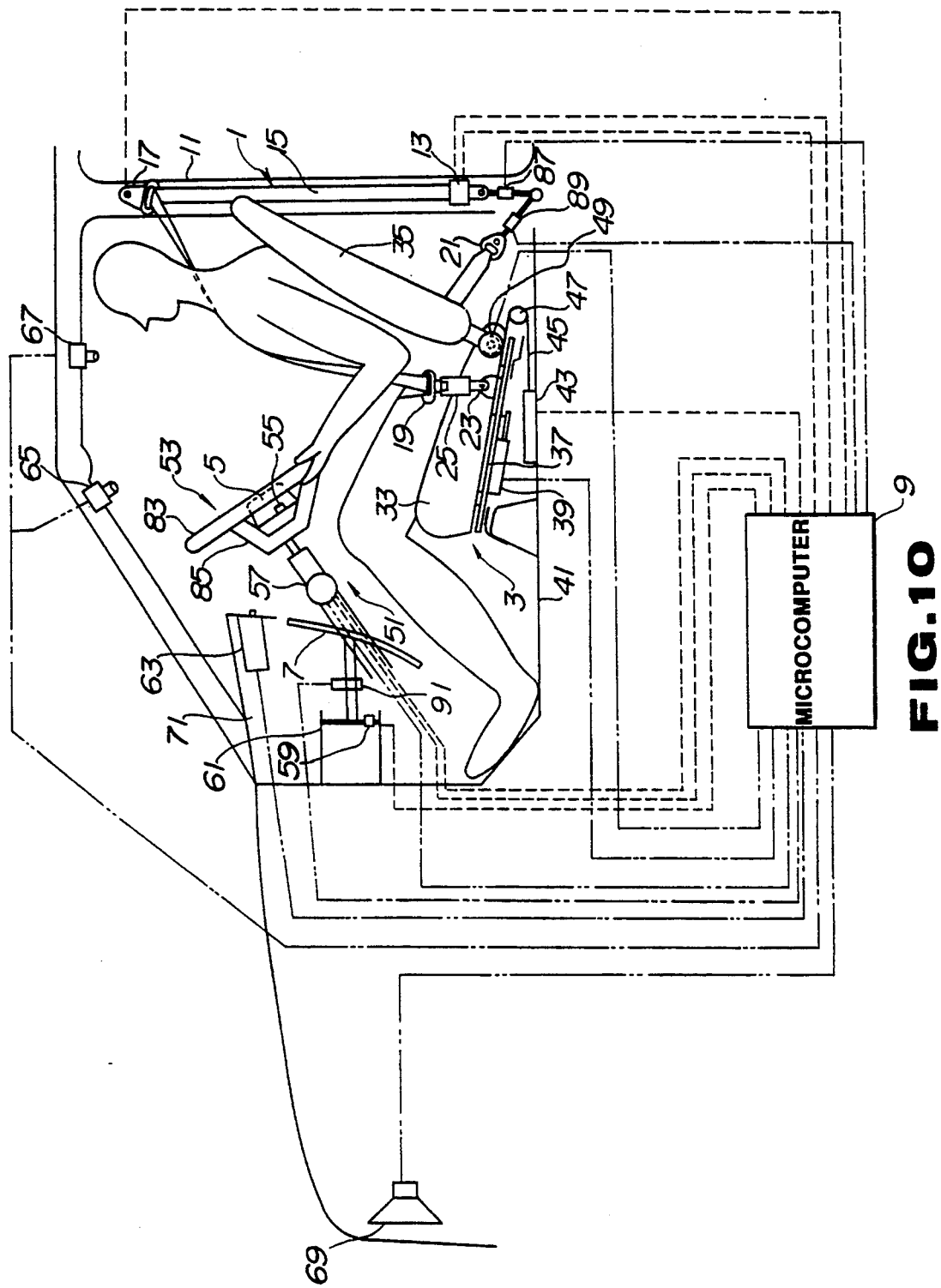

| A<br>SENSORS | B<br>DATA COLLECTION ITEMS | C<br>CONTENTS OF DATA CONVERSION & OPERATION | D<br>DATA USABLE FOR JUDGEMENT OF PASSENGER'S SHOCK |
|---|---|---|---|
| (1) TV CAMERAS FOR MEASURE OF PASSENGER'S BEHAVIOR | TIME SERIES BEHAVIOR OF EACH PART OF PASSENGER (THREE-DIMENSIONS) | ○ DIFFERENTIATE HEAD BEHAVIOR TO OBTAIN HEAD SPEED & ACCELERATION<br>○ DIFFERENTIATE CHEST BEHAVIOR TO OBTAIN CHEST SPEED & ACCELERATION | ○ HEAD LOCUS, SPEED & ACCELERATION (IN TIME SERIES, RESPECTIVELY)<br>○ CHEST LOCUS, SPEED & ACCELERATION (IN TIME SERIES, RESPECTIVELY) |
| (2) LOAD CELL FOR MEASURE OF KNEE PROTECTOR INPUT LOAD | LOAD TO BE INPUTTED TO KNEE PROTECTOR | ○ CONVERT INTO LOAD TO BE AXIALLY INPUTTED TO THIGH BASED ON THIGH ANGLE | ○ THIGH LOAD |
| (3) LOAD CELL FOR MEASURE OF SHOULDER BELT TENSION | SHOULDER BELT TENSION | ○ CALCULATE CHEST DISPLACEMENT FROM SHOULDER BELT TENSION & CHEST BELT MATERIAL CHARACTERISTIC/ SHOULDER BELT LAYOUT | ○ CHEST DISPLACEMENT |
| (4) LOAD CELL FOR MEASURE OF LAP BELT TENSION | LAP BELT TENSION | ○ CALCULATE ABDOMEN LOAD FROM LAP BELT TENSION & PASSENGER'S POSTURE/LAP BELT LAYOUT | ○ ABDOMEN LOAD |

FIG.11

SHOCK ABSORBING INTERIOR SYSTEM FOR VEHICLE PASSENGERS

This application is a continuation of application Ser. No. 07/685,956, filed Apr. 17, 1991, now abandoned.

BACKGROUND OF THE INVENTION

The present invention relates generally to an interior system for an automotive vehicle and, more particularly, to a passenger restraint system for the use upon vehicle collision.

Various types of interior systems for an automotive vehicle have been proposed in past years. One of such interior systems is described, for example, in Manual of Automotive Engineering, 7th version, § 15, pp. 1–128 to 1–134, published by Jidosha Gijutsu Kai. Referring to FIG. 14, this interior system includes, as interior elements, a three-point seat belt arrangement which has a retractor 103 fixed to a center pillar 101 of a vehicle body at the lower portion thereof, a shoulder anchor 107 fixed to the center pillar 101 at the upper portion thereof, an outer anchor 111 fixed to the center pillar 101 at the lower portion thereof, and an inner anchor 113 having a buckle 115. A webbing 105 as drawn from the retractor 103, which passes through the shoulder anchor 107, then a through ring of a tang 109, is connected to the outer anchor 111. A passenger restraint is achieved by insertedly engaging the tang 109 accompanied by the webbing 105 with the buckle 115 of the inner anchor 113.

When developing the automotive vehicle, a vehicle collision test is generally performed to improve the passenger restraint performance. In this test, the vehicle, in which a dummy is seated on a seat and bound by a restraint device such as a seat belt, is made to collide so as to determine a behavior of each part of a passenger, G waveforms of a head, a chest, etc. thereof, and a load of a thigh, etc. thereof. Based on a result of the vehicle collision test, it is examined whether specifications of the vehicle are excellent in passenger restraint performance.

Additionally, a passenger's behavior simulation computation is performed so as to assist such vehicle development based on the collision test. In this computation, the passenger's behavior, and a G waveform and a load of each portion of the vehicle are dynamically calculated by using a microcomputer.

In that event, the microcomputer receives various data: geometric data such as a passenger's constitution, etc.; passenger data such as a passenger's seating posture, etc.; material characteristic data such as a shape, a load-displacement characteristic, etc. of passenger restraint devices and interlots as being in contact with the passenger such as a seat belt arrangement, an air bag, a knee bolster, a floor panel, and a dash board; and collision data such as a vehicle collision speed, a G waveform of vehicle body crush, etc.

With such known interior system for an automotive vehicle, the passenger's behavior simulation compute and the vehicle collision test have taken place so as to obtain a single valid solution to average passenger conditions such as a height, a weight, and a seating posture, and general collision conditions such as a collision speed, and a G waveform of vehicle body crush, thus determining specifications such as a position of each anchor of the seat belt arrangement, and a load-displacement characteristic of the webbing. Accordingly, the known interior system had its limit to provide an optimal passenger restraint performance for every passenger in spite of sufficient passenger restraint.

SUMMARY OF THE INVENTION

It is, therefore, an object of the present invention to provide an interior system for a vehicle which contributes much reduction in an impact to a passenger.

According to one aspect of the present invention, there is provided an interior system for absorbing an energy of an impact on a passenger in a vehicle having a vehicle body, comprising:

a plurality of interior elements mounted to the vehicle body, each having a state variable with respect to the passenger;

a plurality of actuators for said plurality of interior elements;

a plurality of sensors mounted to the vehicle body; and a microcomputer based control unit connected to said plurality of interior elements, said plurality of actuators and said plurality of sensors, said microcomputer based control unit being so constructed and arranged as to:

collect a passenger data, collect a vehicle collision data, collect a first vehicle data in response to said vehicle collision data collected, store a second vehicle data, estimate a behavior of the passenger in response to said passenger data and first vehicle data collected and said second vehicle data stored, compute a characteristic value of each of said plurality of interior elements in a manner to minimize an impact to the passenger in accordance with said behavior estimated, and control said plurality of actuators in response to said characteristic value computed.

According to another aspect of the present invention, there is provided a method of controlling an interior system for absorbing an energy of an impact on a passenger in a vehicle having a vehicle body, the interior system including a plurality of interior elements mounted to the vehicle body, each having a state variable with respect to the passenger, a plurality of actuators for said plurality of interior elements, and a plurality of sensors mounted to the vehicle body, the method comprising the steps of:

collecting a passenger data;

collecting a vehicle collision data;

collecting a first vehicle data in response to said vehicle collision data collected;

storing a second vehicle data;

estimating a behavior of the passenger in response to said passenger data and first vehicle data collected and said second vehicle data stored;

computing a characteristic value of each of the plurality of interior elements in a manner to minimize an impact to the passenger in accordance with said behavior estimated; and controlling the plurality of actuators in response to said characteristic value computed.

BRIEF DESCRIPTION OF THE DRAWINGS

FIG. 1 is a diagrammatic view illustrating a first preferred embodiment of an interior system for an automotive vehicle, with a driver, according to the present invention;

FIG. 2 is an enlarged view illustrating an emergency lock retractor (ELR) with an adjustable load clamp and a preloader;

FIG. 3 is a view similar to FIG. 2, illustrating a shoulder anchor with a webbing and an explosive preloader;

FIGS. 5a to 5c are tables showing preparation process of input data for the use of a passenger's behavior simulation compute;

FIG. 6 is a view similar to FIGS. 5a to 5c, showing measures based on a result of the passenger's behavior simulation compute;

FIG. 10 is a view similar to FIG. 1, illustrating a second preferred embodiment of an interior system for an automotive vehicle, with a driver, according to the present invention;

FIG. 11 is a view similar to FIG. 7, showing preparation process of shock data for the use of shock determination;

DETAILED DESCRIPTION OF THE INVENTION

Figure 4:
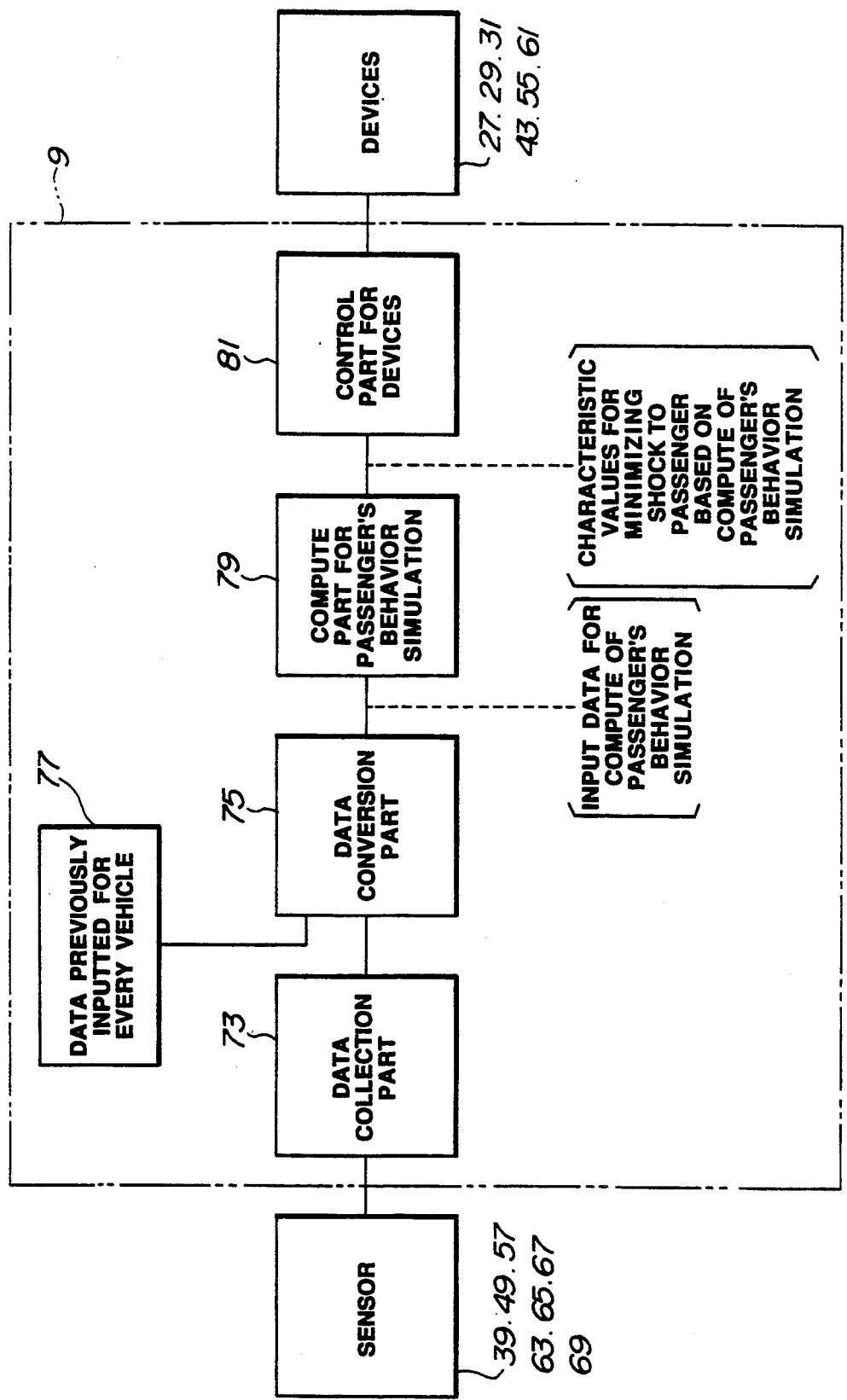
FIG. 4 is a block diagram showing flow of data processing in a microcomputer.

Referring to the drawings, wherein like reference numerals designate corresponding part throughout the views, referring particularly to FIGS. 1 to 9, an interlot system for an automotive vehicle embodying the present invention includes, as interior elements each having a state variable with respect to a passenger, a three-point seat belt arrangement 1 having a variable passenger restraint performance, and a seat 3, an air bag 5, and a knee bolster 7 as related devices. Additionally, the interior system includes, as control means, a microcomputer 9 for controlling actuators for the seat belt arrangement 1, the seat 3, the air bag 5, and the knee bolster 7.

In a first preferred embodiment, the microcomputer 9 includes operation means for computing a passenger's behavior simulation in accordance with a passenger's behavior simulation program, thus constituting means for estimating a passenger's behavior produced by an impact inputted to the vehicle.

The seat belt arrangement 1 has an emergency lock retractor (ELR) 13 fixed to a center pillar 11 of a vehicle body at the lower portion thereof, a shoulder anchor 17 fixed to the center pillar 11 at the upper portion thereof, an outer anchor 21 fixed to the center pillar 11 at the lower portion thereof, and an inner anchor 23 having a buckle 25. A webbing 15 as drawn from the retractor 13, which passes through the shoulder anchor 17, then a through ring of a tang 19, is connected to the outer anchor 21. A passenger restraint is achieved by insertedly engaging the tang 19 accompanied by the webbing 15 with the buckle 25 of the inner anchor 23. An adjustable load clamp 27, and a preloader 29 are integrated with the ELR 13 as shown in FIG. 2, whereas an explosive preloader 31 is integrated with the shoulder anchor 17 as shown in FIG. 3 so as to instantaneously urge to move the anchor 17 in a vertical direction.

The seat 3 includes a seat cushion 33, and a seat back 35. The seat cushion 33 is back and forth movably supported to slide rails 37, whereas the seat back 35 is connected to the seat cushion 33 through a reclining mechanism (not shown). To the slide rails 37 is arranged a linear potentiometer 39 for detecting a slide position of the seat 3, which serves as a seat slide amount detecting sensor. A wire 45 interconnects, via a pulley 47, the seat cushion 33 and an explosive preloader 43 which is arranged on a floor panel 41 located below the seat 3. Thus, when the explosive preloader 43 operates, the seat 8 is urged to move backward in a forced manner. The reclining mechanism of the seat back 85 includes a rotary potentiometer 49 for detecting an inclination of the seat back 35, which serves as a seat back inclination detecting sensor.

The air bag 5 is arranged in the center of a steering wheel 53 of a steering arrangement Connected thereto are a variable set pressure type pressure valve 55 for setting internal pressure of the air bag 5, and an ignition signal circuitry (not shown) for setting an ignition time. Disposed to the steering arrangement 51 is a rotary potentiometer 57 for detecting a tilt angle of the steering wheel 53, which serves as a steering tilt amount detecting sensor.

The knee bolster 7 is disposed below a dash board 71. Mounted thereto is an adjustable orifice diameter damper 61, which serves as an impact absorbing member.

In the first preferred embodiment, the adjustable load clamp 27, the preloader 29, the explosive preloaders 31 and 43, the variable set pressure type pressure valve 55 and ignition circuitry, and the adjustable orifice diameter damper 61 serve as the actuators for actuating the seat belt arrangement 1, the seat 3, the air bag 5, and the knee bolster 7.

Connected to an input port of the microcomputer 9 are a data input device 63 for inputting a passenger data, telecameras 65 and 67 for detecting as a vehicle data a passenger's seating posture, a seat slide amount detecting sensor 39 for detecting a slide position of the seat 3, a seat back inclination detecting sensor 49 for detecting an inclination of the seat back 35, and a steering tilt amount detecting sensor 57 for detecting a tilt angle of the steering wheel 53. Also connected thereto is a laser radar 69 for detecting a vehicle collision data, which serves as detection means.

On the other hand, connected to an output port of the microcomputer 9 are the adjustable load clamp 27 and preloader 29 of the ELR 13, the explosive preloader 31 of the shoulder anchor 17, the explosive preloader 43 of the seat 3, the variable set pressure type pressure valve 55 and ignition circuitry of the air bag 5, and the adjustable orifice diameter damper 61 of the knee bolster 7.

The data input device 63 includes a passenger data card reader, and a passenger data manual input device, and is mounted to the dash board 71, for example. The passenger data card reader is arranged for the use of, principally, an owner driver. Geometric data such as a length, a weight, a position of a center of gravity, a moment of inertia of each segment of a passenger which are previously determined on the physical examination, and joint characteristics such as an angle-torque characteristic of each Joint of the passenger are inputted to a data card. When getting in the vehicle, the driver puts this card in the passenger data card reader so as to input such passenger data to the microcomputer 9. On the other hand, the passenger data manual input device is arranged for the use of, principally, a driver other than the owner driver. The driver manually inputs to the microcomputer 9 the passenger data such as a sex, an age, a weight, a height, a percentile, a race, etc. so far as his knowledge goes. The microcomputer 9 converts the input passenger data into the geometric data and Joint data by using a conversion program previously inputted. By way of example, a GEBOD program as developed by U.S. Air Force serves as the conversion program.

The telecameras 65 and 67, which serve to perform image processing of the passenger's seating posture, are mounted to the vehicle body in a manner to be positioned in front of and on the side of the passenger.

The laser radar 69, which detects immediately before the collision a relative speed of the vehicle with a crash object, and a shape thereof as vehicle collision data, is mounted to the vehicle body at the front portion thereof.

Referring to FIG. 4, a description will be made with regard to flow of data processing in the first preferred embodiment.

The microcomputer 9 reads in a data collection part 73 raw data derived from the sensors 39, 49, 57, 65, 67, and 69, and data inputted to the data input device 63. In a data conversion part 75, these data are converted into input data for the use of compute of the passenger's behavior simulation. In that event, a data 77 may be used. This data 77 is obtained by previously performing a test and a measure for every vehicle, and stored in the microcomputer 9. Using each input data as converted, a simulation computation is performed in a computation part 79 as operation means based on a passenger's behavior simulation program. On this simulation computation, when the vehicle collision data is inputted from the laser radar 69, a passenger's behavior is estimated based on a positional state of each interior element, a passenger's constitution, etc. Next, a characteristic value to minimize an impact to the passenger is derived from the positional state of each safety element, the passenger's constitution, etc., and the estimated passenger's behavior. There are known, as the passenger's behavior simulation program, a CAL3D program principally developed by U.S. Air Force, and a MADYMO program developed by TNO Company in Holland which are three-dimensional, and a MVMA-2D program developed by Michigan University in U.S. which is two-dimensional. There are many programs individually developed by the other companies and institutes, which are substantially the same in a calculation principle, and also in required input data, and a result of calculation. Accordingly, any of the passenger's behavior simulation program may be used in this embodiment.

Next, based on the result of calculation, a control part 81 as control means outputs a signal which actuates the adjustable load clamp 27, the preloader 29, the explosive preloaders 31 and 43, the variable set pressure type pressure valve 55 and ignition signal circuitry, and the adjustable orifice damper 61 as the actuators, thus altering restraint characteristics of the seat belt arrangement 1, the seat 3, the air bag 5, and the knee bolster 7 to minimize an impact to the passenger.

Figure 5A:
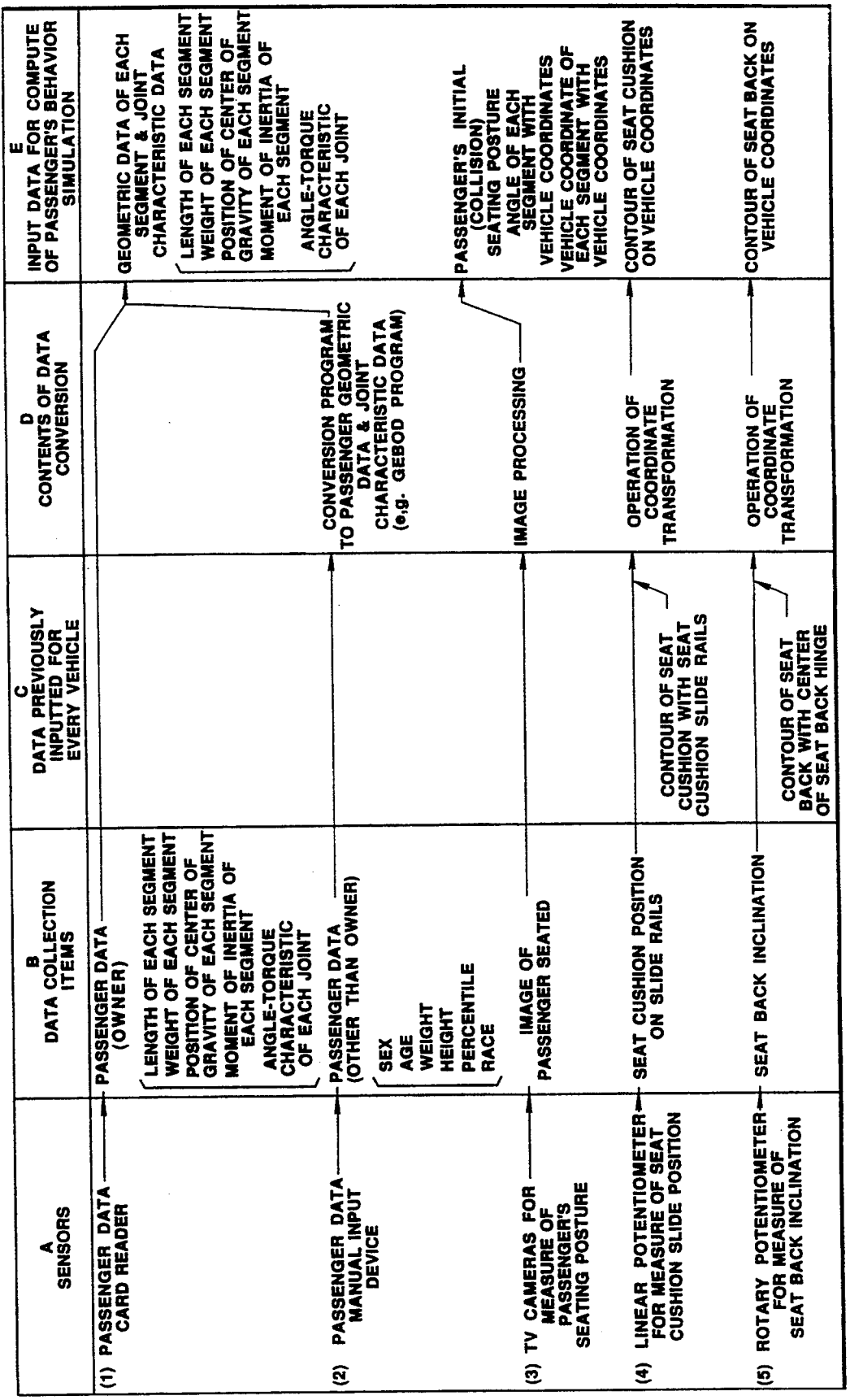
Figure 5B:
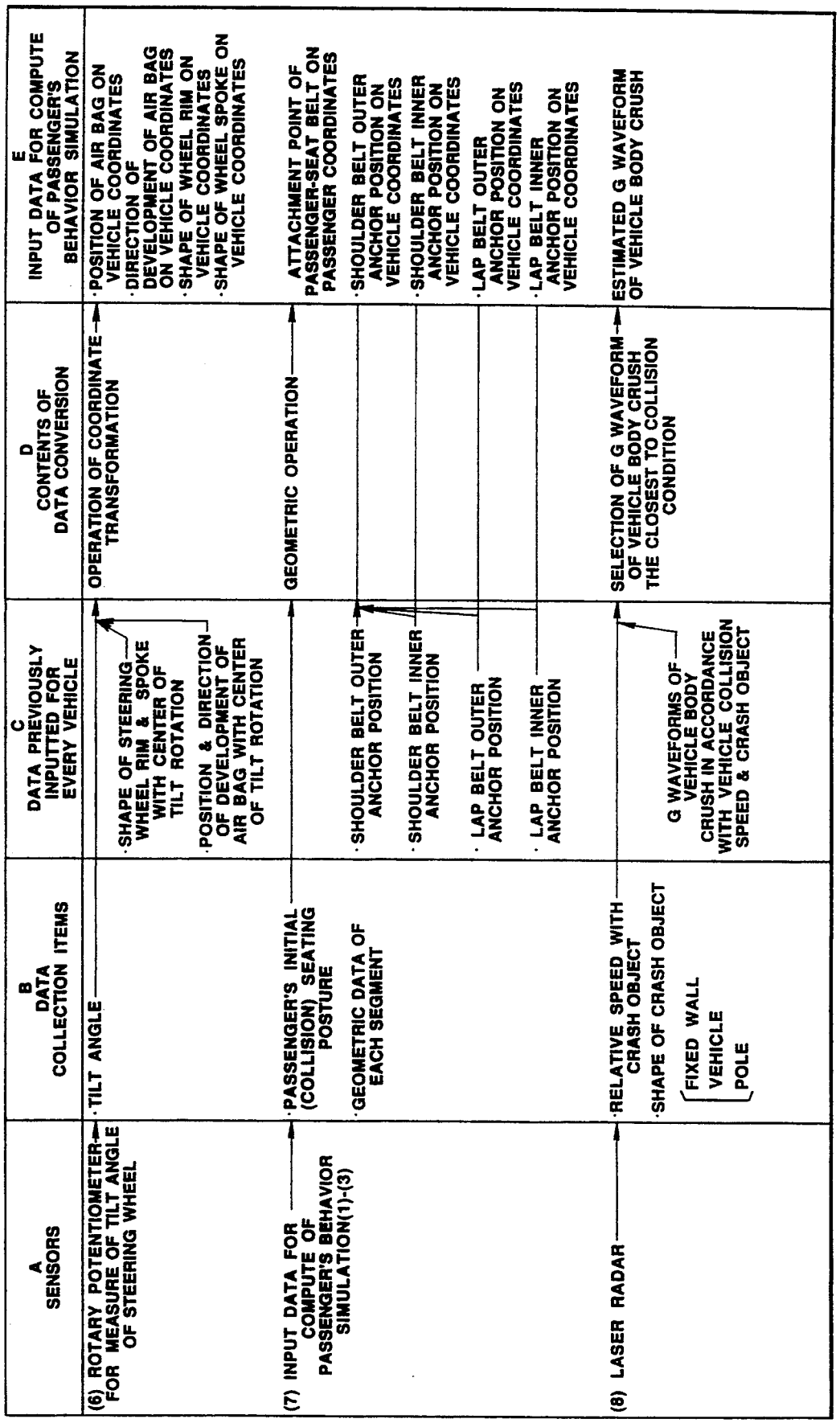

Referring to FIGS. 5a to 5c, there is shown conversion process from the data of the data input device 63, the sensors 39, 49, 57, 65, 67, and 69 to the input data for compute of passenger's behavior simulation. FIGS. 5a to 5c are tables having columns: A for sensors, B for data collection items, C for data previously inputted for every vehicle, D for contents of data conversion, and E for input data for compute of passenger's behavior simulation.

Specifically, a passenger data (column B) is inputted by putting the data card in the passenger data card reader of the data input device 63 as indicated in (1) in FIG. 5a, or by manually operating the passenger data manual input device as indicated in (2) in FIG. 5a. The passenger data is converted into the geometric data and joint characteristic data for each segment corresponding to a bone of principal joint of the passenger, which are input data (column E). It is to be noted that the conversion program (column D) is used in the event of manual operation as indicated in (2) in FIG. 5a.

As indicated in (3) in FIG. 5a, an image of the passenger seated (column B) as detected by the telecameras 65 and 67 undergoes image processing (column D), determining an angle and a position of each segment of the passenger on vehicle coordinates as the passenger's initial (upon collision) seating posture, which are input data (column E).

As indicated in (4) in FIG. 5a, a position of the seat cushion 33 on the slide rails 37 (column B) as detected by the seat slide amount detecting sensor 39 undergoes coordinate transformation operation (column D) based on a data for contour of the seat cushion 33 with the slide rails 37 (column C) which is previously inputted to the microcomputer 9, determining a contour of the seat cushion 33 on the vehicle coordinates, which is input data (column E).

As indicated in (5) in FIG. 5a, an inclination of the seat back 35 (column B) as detected by the seat back inclination detecting sensor 49 undergoes coordinate transformation operation (column D) based on a data for contour of the seat back 35 with the center of a seat back hinge (column C) which is previously inputted to the microcomputer 9, determining a contour of the seat back 35 on the vehicle coordinates, which is input data (column E).

As indicated in (6) in FIG. 5b, a tilt angle of the steering wheel 53 (column B) as detected by the steering wheel tilt amount detecting sensor 57 undergoes coordinate transformation operation (column D) based on a data for shape of a rim 83 and a spoke 85 of the steering wheel 53 with the center of tilt rotation, and a data for position and direction of development of the air bag 5 (column C) which are previously inputted to the microcomputer 9, determining a shape of the rim 83 and the spoke 85 of the steering wheel 53, and a position and a direction of development of the air bag 5 on the vehicle coordinates, which are input data (column E).

As indicated in (7) in FIG. 5b, a data for passenger's initial (upon collision) seating posture and a geometric data for each segment (column B) as obtained from the passenger data inputted to the data input device 63 and the image of the telecameras 65 and 67 undergoes geometric operation based on positions of the shoulder anchor 17, the outer anchor 21, and the inner anchor 23 which are previously inputted to the microcomputer 9, determining attachment points a, b, c, and d of the passenger to the seat belt arrangement 1 on passenger coordinates, and positions of the shoulder anchor 17, the outer anchor 21, and the inner anchor 23 on the vehicle coordinates, which are input data (column E).

As indicated in (8) in FIG. 5b, a relative speed of the vehicle with the crash object, and a shape thereof, e.g. a fixed wall, a pole, and a vehicle (column B) as detected by the laser radar 69 are used for retrieval of G waveforms of vehicle body crush in accordance with the vehicle collision speed and crash object (column C) which are previously inputted to the microcomputer 9, selecting one of the G waveforms of vehicle body crush as being the closest to the collision condition (column D), which is input data (column E).

Additionally, as indicated in (9) to (11) in FIG. 5c, the microcomputer 9 has the other input data such as contours of the floor panel 41, and the dash board 71 on the vehicle coordinates, load-displacement characteristics thereof, and load-displacement characteristics of the seat cushion 33, and the seat back 35 (columns C and E).

Next, a description will be made with regard to the contents of parameter study to improve the passenger restraint performance, and the actuators for achieving characteristic values to minimize an impact to the passenger.

Referring to FIG. 6, in the first preferred embodiment, the following parameters are established and controlled to improve the passenger restraint performance: (1)—load-displacement characteristic of the seat belt arrangement 1, (2)—position of the shoulder anchor 17, (3)—internal pressure of the air bag 5, (4)—ignition time of the air bag 5, (5)— load-displacement characteristic of the knee bolster 7, and (6)—position of the seat 3. By alternating these parameters, the simulation computation is performed to obtain the characteristic values for minimizing an impact to the passenger.

Based on results of the simulation computation, the operations take place as follows:

The load-displacement of the seat belt arrangement 1 is controlled by actuating the adjustable load clamp 27 and the preloader 29 integrated with the ELR 13.

The position of the shoulder anchor 17 is controlled by actuating the explosive preloader 31 so as to instantaneously urge to move the shoulder anchor 17 in the vertical direction.

The internal pressure of the air bag 5 is controlled by adjusting the variable set pressure type pressure valve 55 so as to change a value when the passenger comes in contact with the air bag 5, and same upon passenger restraint.

The ignition time of the air bag 5 is established by controlling a delay circuitry arranged in the ignition signal circuitry.

The load-displacement characteristic of the knee bolster 7 is controlled by adjusting an orifice diameter of the adjustable orifice diameter damper 61 arranged to the knee bolster 7.

The position of the seat 3 is controlled by actuating the explosive preloader 43 so as to draw the seat cushion 33 backward through the wire 45.

Next, the operation of the first preferred embodiment will be described.

First, when getting in the vehicle, the passenger puts the data card in the data input device 63, or manually operates the device 63 to input the passenger data to the microcomputer 9.

Figure 7:
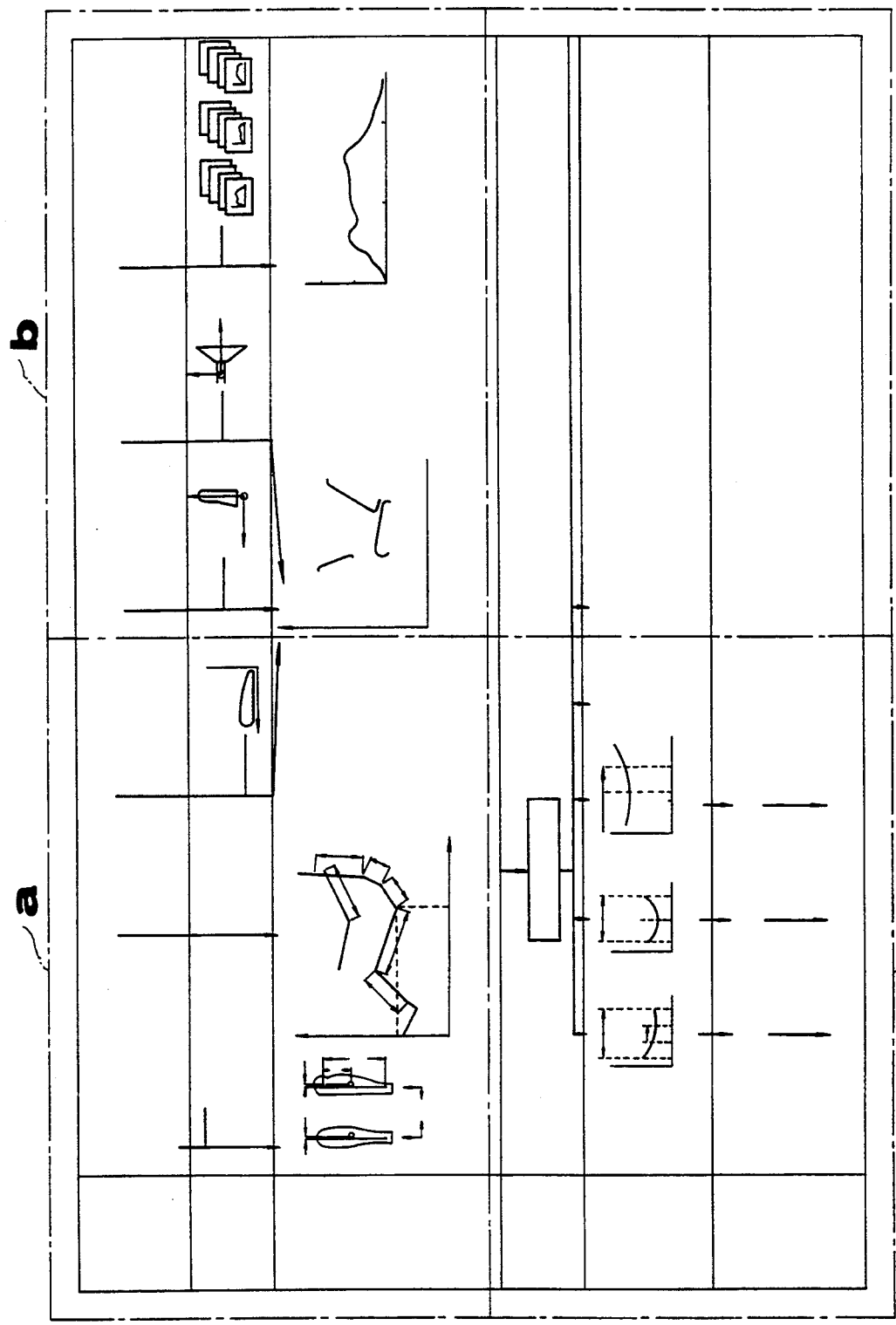
FIG. 7 is a view similar to FIG. 6, showing a passenger's behavior simulation control.

During driving, as soon as information from the laser radar 69 indicates that the vehicle collision is inevitable, all the sensors 39, 49, 57, 65, and 67 start to function. Referring to FIG. 7, the microcomputer 9 receives the raw data such as the passenger's seating posture, the position of the seat cushion 88 on the slide rails 37, the inclination of the seat back 85, the tilt angle of the steering wheel 53, and the relative speed with the crash object and shape thereof detected by the these sensors 39, 49, 57, 65, and 67, respectively. The data collection items are indicated in a column I in FIGS. 7a and 7b.

Figure 7A:
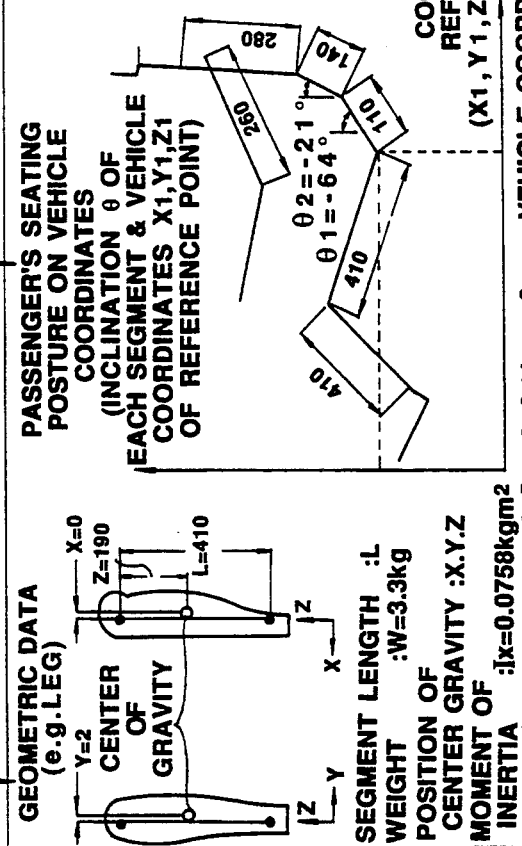
FIGS. 7a to 7c are enlarged views of divisions a, b, and c in FIG. 7, respectively.
Figure 7B:
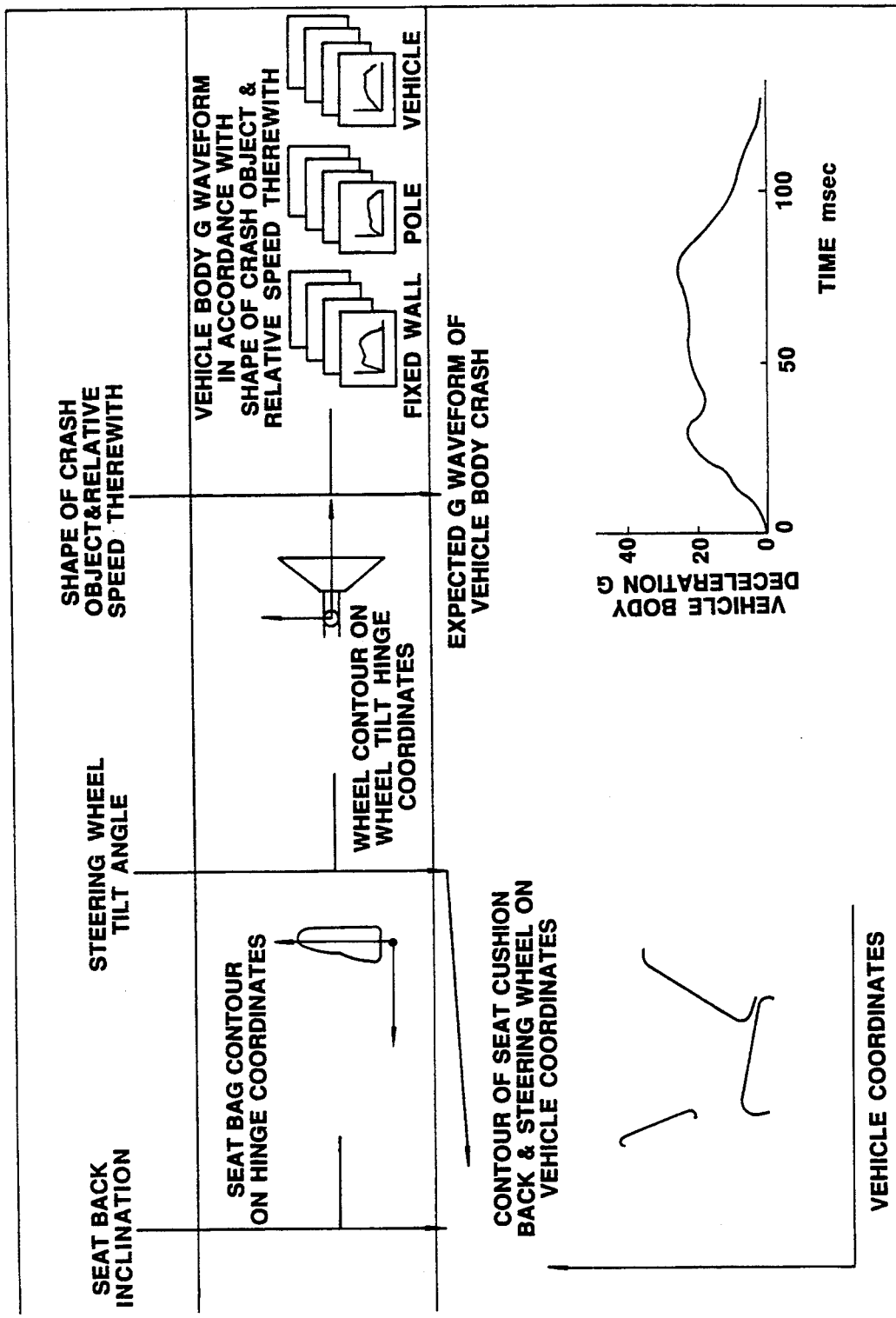

Referring to FIG. 7, particularly to FIGS. 7a and 7b, the raw data and the vehicle data as previously inputted to the microcomputer 9 (column II) are converted into input data for the use of the computation of passenger's behavior simulation (column III). These input data are, for example, the passenger's geometric data, the passenger's seating posture on the vehicle coordinates, the contours of the seat cushion 3, the seat back 35, and the steering wheel 53, and the estimated G waveform of vehicle body crush as indicated hereinbefore.

Figure 8:
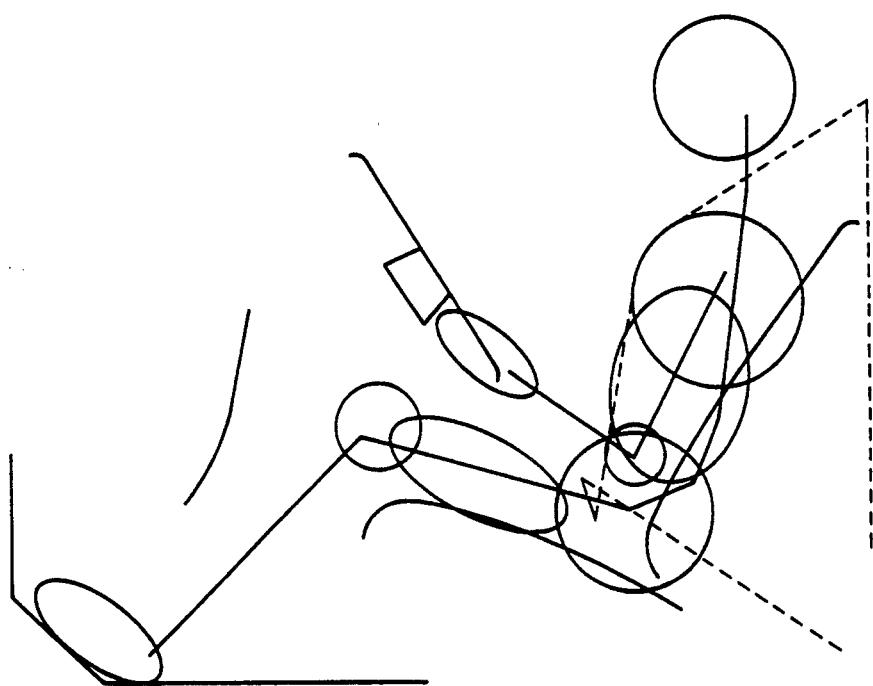
FIG. 8 is a schematic view illustrating, in a graphic model manner, layout and shape data as transformed into the input data for the passenger's behavior simulation compute.

Referring to FIG. 8, the shape and layout data as transformed into the input data are shown in a graphic model manner.

Figure 7C:
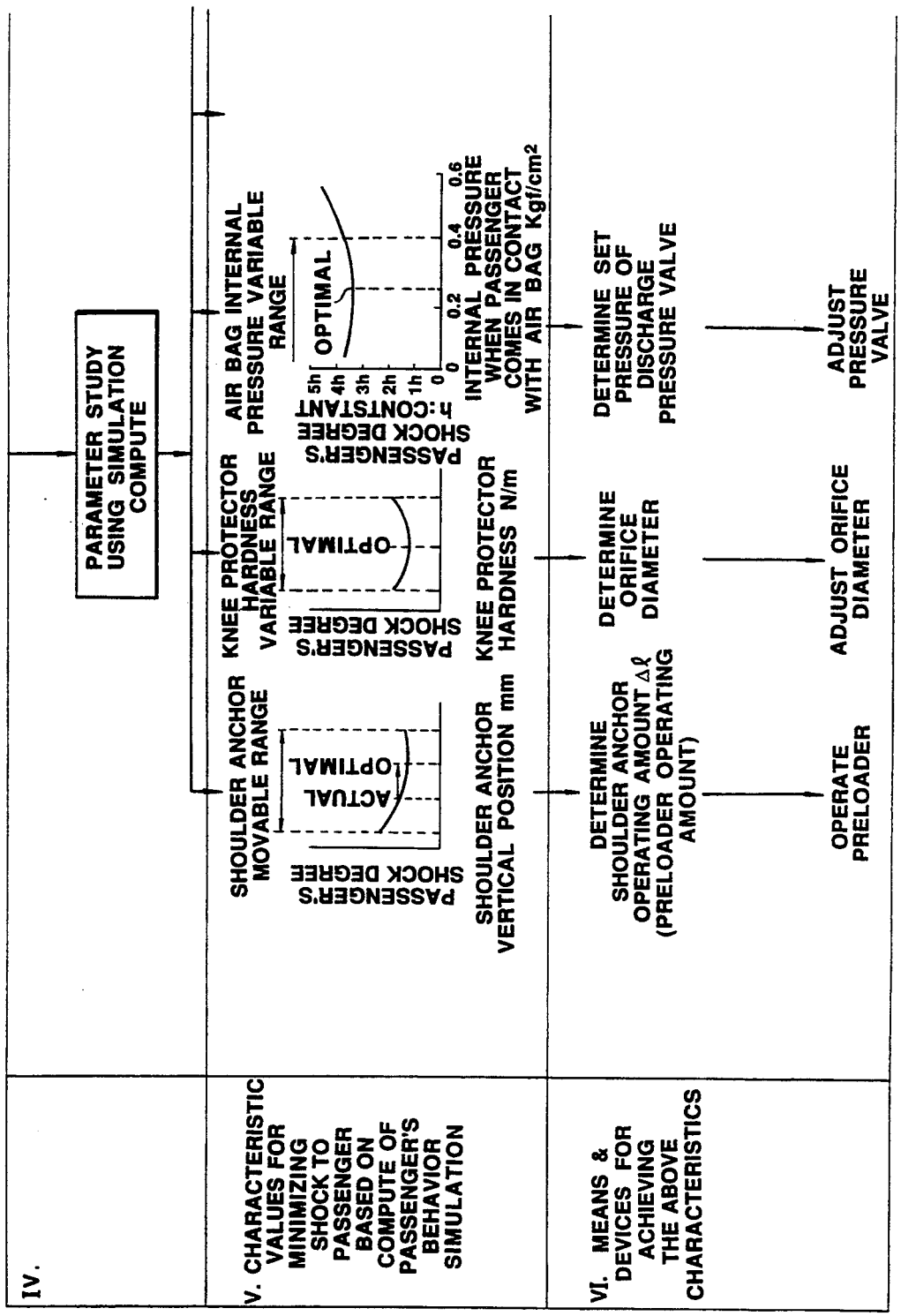

Referring again to FIG. 7, particularly to FIG. 7c, based on the input data, calculation is made based on the passenger's behavior simulation program (column IV). First, the passenger's behavior upon vehicle collision is estimated. Then, a passenger's shock degree is calculated by alternating the parameters which are variable to optimize the passenger restraint performance, viz., load-displacement characteristic of the seat belt arrangement 1, position of the shoulder anchor 17, internal pressure of the air bag 5, ignition time thereof, load-displacement characteristic of the knee bolster 7, and position of the seat 3 in the first preferred embodiment, obtaining the characteristic values to minimize an impact to the passenger (columns IV and V).

Figure 9:
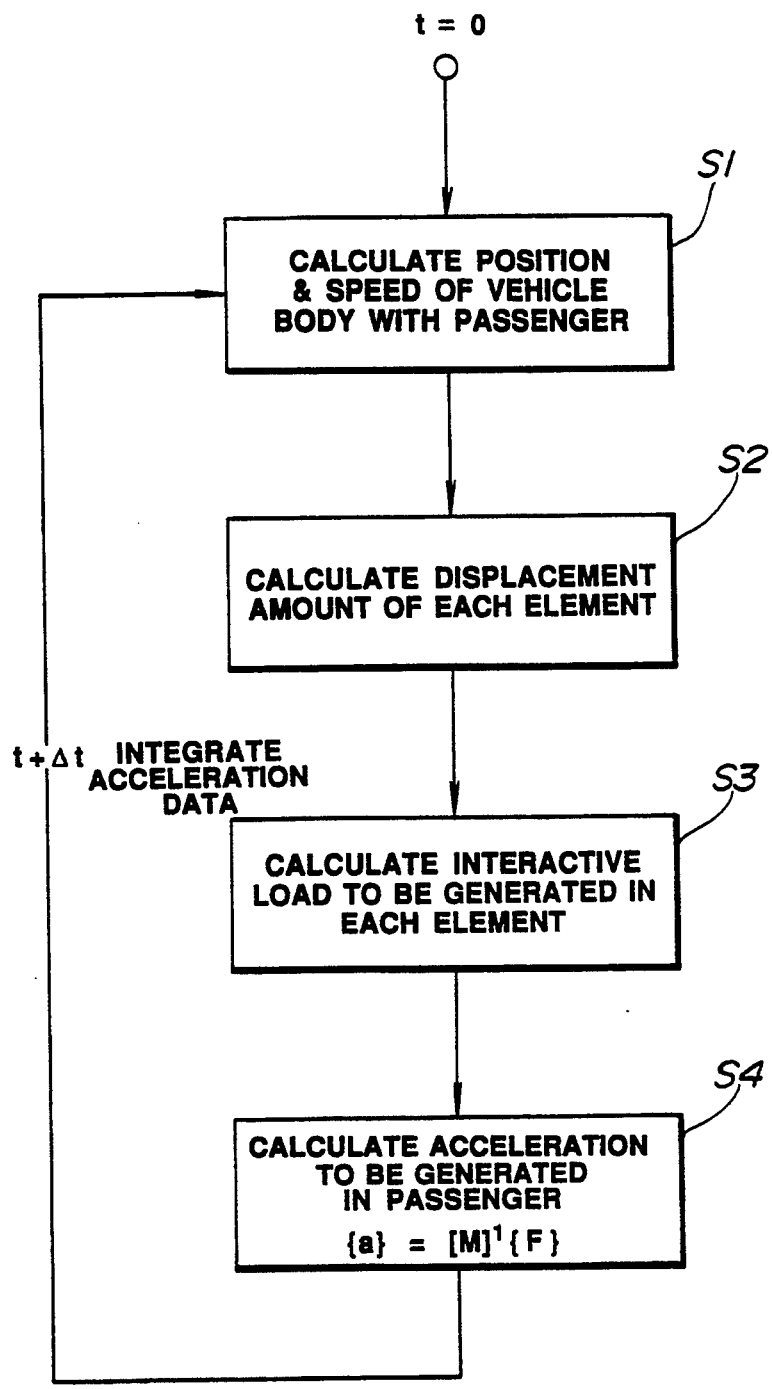
FIG. 9 is a flowchart of a parameter study based on a passenger's behavior simulation program.

Referring to FIG. 9, a detailed description will be made with regard to the passenger's behavior simulation compute in the column IV in FIG. 7.

First, at a step S1, a position and a speed of the vehicle body with the passenger and interior are calculated. A result of this calculation defines the passenger's behavior.

At a step S2, based on position and speed data as obtained at the step S1, a displacement amount of each element of the vehicle body and the passenger is calculated in a geometric manner.

Subsequently, at a step S3, based on displacement data as obtained at the step S2, an interactive load to be generated in each element is calculated in accordance with the load-displacement characteristic of each element which is previously inputted to the microcomputer 9.

At a subsequent step S4, based on the interactive load, an acceleration a to be generated in each element is calculated from the Newton's equation of motion:

$$\{a\} = \lambda M]^{-1}\{F\}$$

wherein a is an acceleration to be generated in each element, M is a mass thereof, and F is a load operating thereto. A result of this calculation defines an acceleration or deceleration to be generated in the passenger which is used for calculation of a passenger's impact degree.

Then, the control returns to the step S1 where the position and speed of the vehicle body with the passenger and interior after Δ t (delta t) is calculated by integrating the acceleration data of each element.

Referring again to FIG. 7, particularly to FIG. 7c, the characteristic values to minimize an impact to the passenger are selected based on the aforementioned result of calculation, determining, for example, a displacement amount of the preloader 29 of the shoulder anchor 17, an orifice diameter of the adjustable orifice diameter damper 61, a set pressure of the variable set pressure type pressure valve 55 for the air bag 5, etc. Thus, when operating the preloader 29, and adjusting the orifice diameter and the set pressure, the seat belt arrangement 1, the air bag 5, and the knee bolster 7 ensure an optimal passenger restraint performance.

As described above, in accordance with detailed passenger's geometric characteristics, passenger conditions such as a seating posture, vehicle conditions such as the seat cushion 33, the seat back 35, and the steering wheel 53, and collision conditions such as a collision speed, and a crash object, the characteristics of the seat belt arrangement 1, the air bag 5, and the knee bolster 7 are adjusted in a minute manner.

It is desirable that this adjustment is completed before vehicle collision. However, immediately after vehicle collision, for example, after about 20 msec, the passenger will scarcely urge to move, so that the characteristics of the seat belt arrangement 1, the air bag 5, and the knee bolster 7 may be finished establishing before that moment.

Accordingly, since the passenger is bound by the restraint system and the related devices thereof which have characteristic values to minimize an impact to the passenger in accordance with the passenger, vehicle, and collision conditions, an optimal passenger restraint is always achieved, and an impact to the passenger is limited to a minimal level, resulting in the increase in safety.

Since the input data for the passenger's behavior simulation computation are known except a relative speed with a crash object, a calculation time can be shortened by performing a previous simulation with the relative speed of 100 km/h, or 200 km/h, for example.

Referring to FIGS. 10 to 13, there is shown a second preferred embodiment of the present invention.

In the first preferred embodiment, the control takes place based on the operation as performed immediately before or after vehicle collision, whereas, in the second preferred embodiment, the control takes place based on the operation as performed during the entirety of time in which the vehicle undergoes an impact, and in accordance with a time change in the impact. That is, also after vehicle collision, a passenger's impact degree is detected by the sensors in a time series manner. If it is determined that the impact degree becomes extremely high, the parameter study is performed based on the passenger's behavior simulation program so as to obtain a feed-back control to optimize the characteristic values of the passenger restraint system and the related devices.

Referring to FIG. 10, a safety system includes, for that purpose, a load cell 91 as a knee bolster load detecting sensor, a load cell 87 as a shoulder belt tension detecting sensor, and a load cell 89 as a lap belt tension detecting sensor. These load cells 87, 89, and 91 as impact degree detecting means are connected to the input port of the microcomputer and the telecameras 65 and 67 detect the behavior of each part of the passenger in a time series manner.

Referring to FIG. 11, there is shown conversion process from data collected by the sensors 65, 67, 87, 89, and 91 to impact judgement data.

As indicated in (1) in FIG. 11, three-dimensional behavior data (column B) as detected by the telecameras 65 and 67 (column A) in a time series manner are differentiated, obtaining a locus, a speed, and an acceleration of the passenger's head, and chest in a time series manner (column C), which are impact judgement data (column D).

As indicated in (2) in FIG. 11, an input load to the knee bolster 7 (column B) as detected by the knee protector load detecting sensor 91 (column A) is transformed into a load to be axially operated to the thigh (column C) based on a passenger's thigh angle detected by the telecameras 65 and 67, which is impact judgement data (column D).

As indicated in (3) in FIG. 11, based on a shoulder belt tension (column B) as detected by the shoulder belt tension detecting sensor 87 (column A), and a chest belt material characteristic and a shoulder belt layout as previously inputted to the microcomputer 9, a passenger's chest displacement is determined (column C), which is impact judgement data (column D).

As indicated in (4) in FIG. 11, based on a lap belt tension (column B) as detected by the lap belt tension detecting sensor 89 (column A), a passenger's seating posture as detected by the telecameras 65 and 67, and a lap belt layout as previously inputted to the microcomputer 9, a passenger's abdomen load is determined (column C), which is input data (column D).

The aforementioned head and chest locus, speed, and acceleration, thigh load, chest displacement, and abdomen load are used for determination of a passenger's impact degree.

Figure 12:
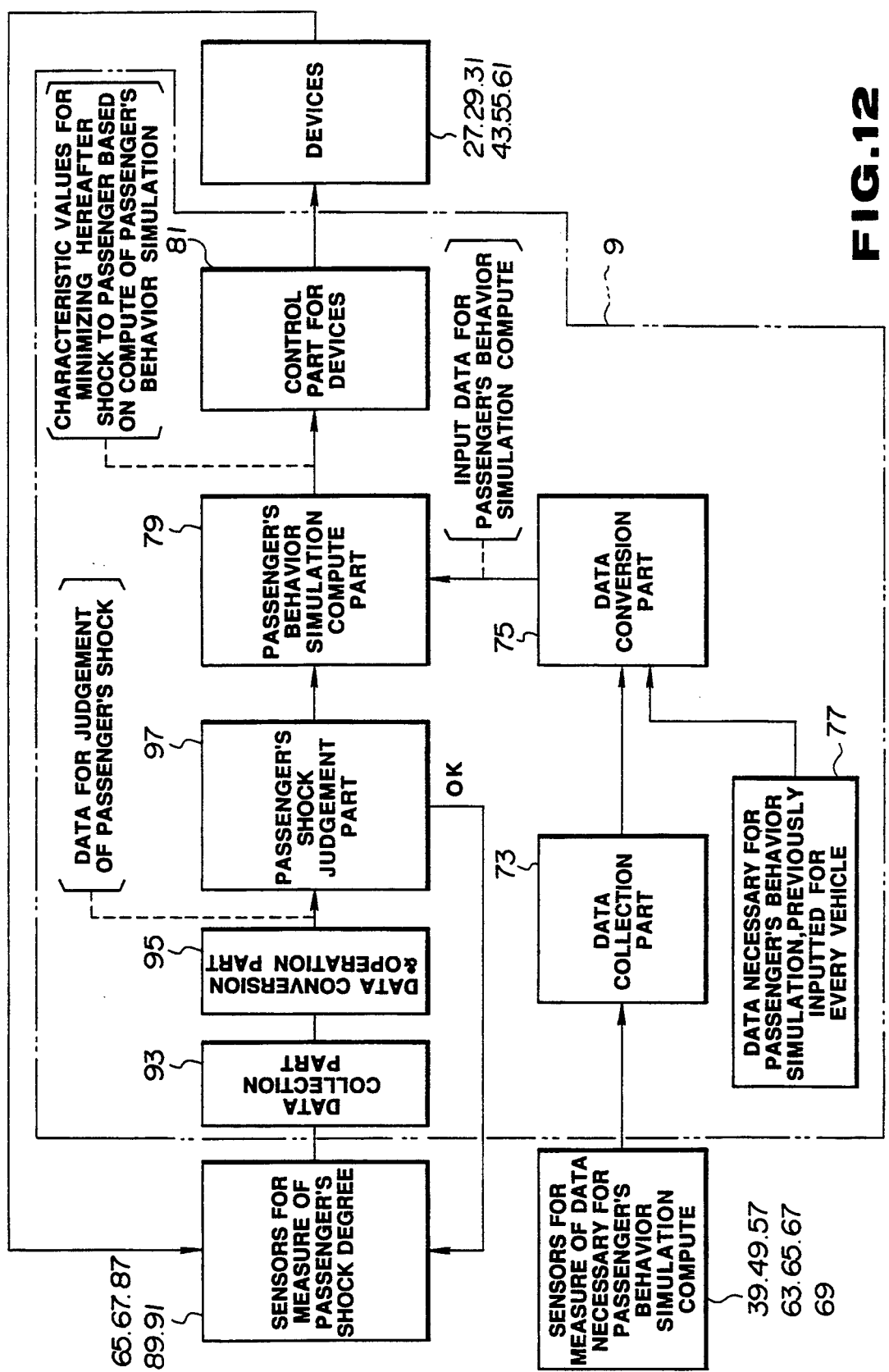
FIG. 12 is a view similar to FIG. 4, showing flow of data processing in a microcomputer in the second preferred embodiment.

Referring to FIG. 12, a description will be made with regard to flow of data processing in the second preferred embodiment.

First, the microcomputer 9 reads in a data collection part 93 raw data from the sensors 65, 67, 87, 89, and 91 for detecting a passenger's impact degree after vehicle collision. In a data conversion part 95, these raw data are converted into impact data. Based on the impact data, a passenger's impact degree is determined in an impact judgement part 97 in a time series manner. If it is determined that the passenger will undergo an excessive impact without some measure, calculation is performed in a compute part 79, using the input data for passenger's behavior simulation computation and based on the passenger's behavior simulation program.

Figure 13:
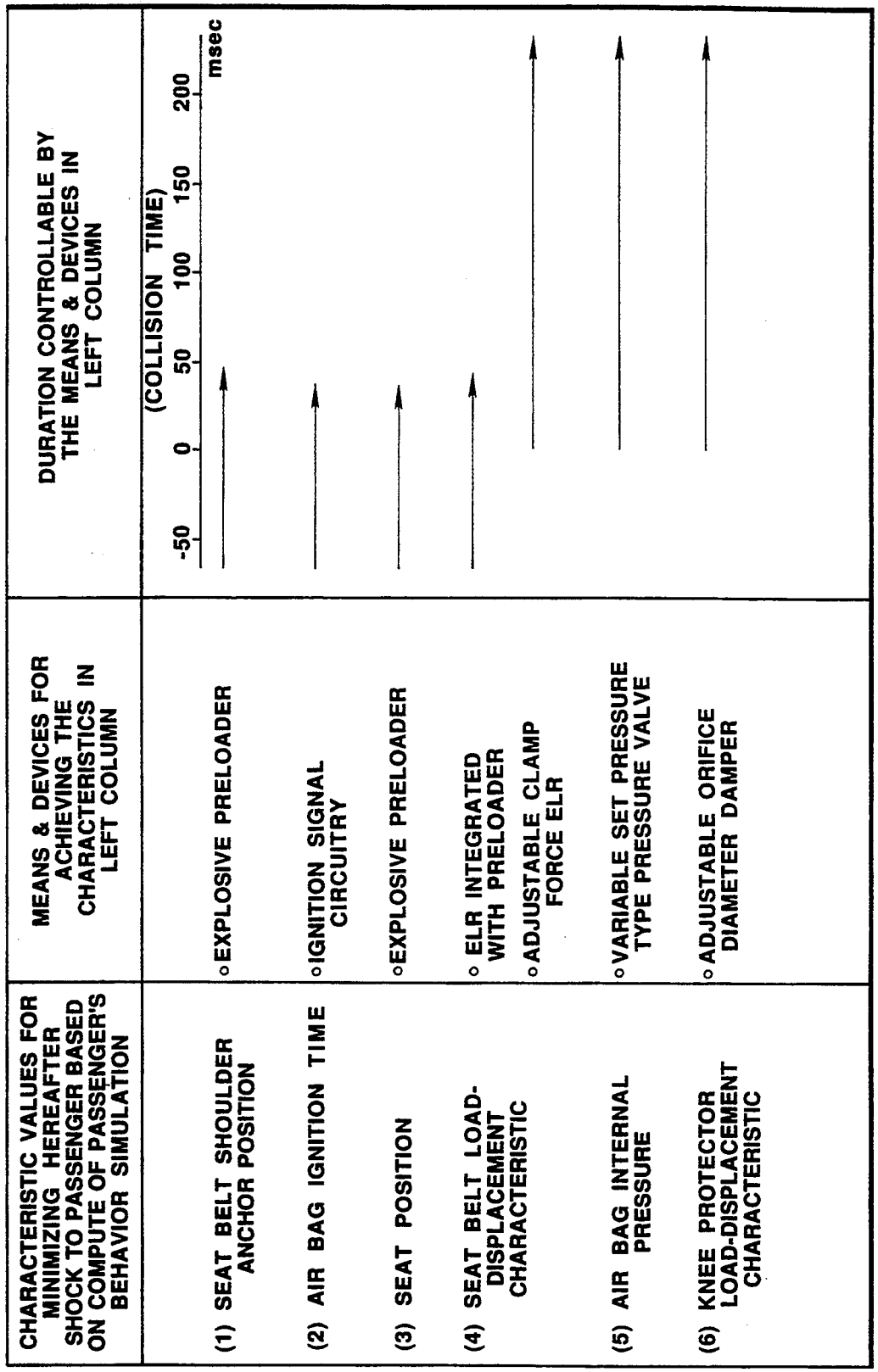
FIG. 13 is a view similar to FIG. 11, showing measures based on a result of the passenger's behavior simulation compute, and a time duration controllable.
Figure 14:
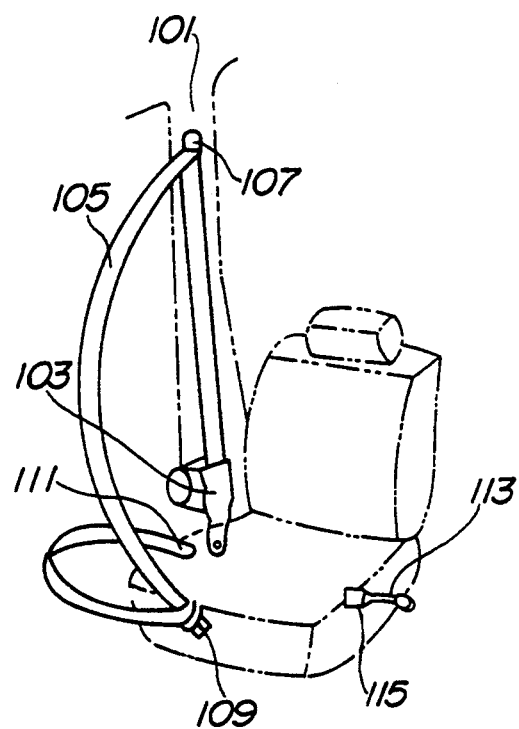
FIG. 14 is a perspective view illustrating a known passenger restraint system for an automotive vehicle.

Referring to FIG. 13, in that event, the following parameters are established and controlled in a time series manner: (1)—shoulder anchor position, (2)—air bag ignition time, (3)—seat position, (4)—seat belt load-displacement characteristic, (5)—air air bag internal pressure, and (6)—knee bolster load-displacement characteristic. By altering values of the parameters, the passenger's impact degree is calculated to obtain characteristic values to minimize an impact to the passenger.

Thus, in a similar manner to the first preferred embodiment, the seat belt arrangement 1, the air bag 5, and the knee bolster 7 ensure an optimal passenger restraint performance.

Thereafter, detection in the passenger's impact degree sensors 65, 67, 87, 89, and 91, and Judgement in the impact degree Judgment part 97 take place in a continuous manner. If it is determined that the passenger will undergo a more excessive load without some measure due to an error between determination in the impact degree Judgement part 97 and result of passenger's behavior simulation computation, the simulation compute is performed again, correcting each characteristic value.

A time duration to be controllable for the characteristic values is indicated in a right column in FIG. 13.

Accordingly, in the second preferred embodiment, since the same effect as that in the first preferred embodiment is obtained, and the restraint characteristics of the restraint system and related devices are controlled due to feed-back control as minutely performed also after vehicle collision, the passenger is bound during the entirety of restraint time in an optimal condition and with a decreased shock, resulting in the improvement in safety.

What is claimed is:

1. An interior system for absorbing an impact to a passenger in a vehicle, comprising:
   a plurality of interior elements mounted to the vehicle, each said interior element having a position state with respect to the passenger;
   at least one actuator for each of said plurality of interior element, said actuators producing said position states of said interior elements;
   first sensor means mounted to the vehicle for detecting parameters of a vehicle collision;
   second sensor means mounted to the vehicle for visually detecting position of the passenger in real time before, during and after a collision; and
   a microcomputer based control unit disposed to control said actuators responsive to said first sensor means and said second sensor means,
   said microcomputer based control unit including:
      means for estimating movement of the passenger upon, during and after said collision of the vehicle responsive to said second sensor means detecting position and,
      means for computing an optimum position state of said plurality of interior elements in a manner to minimize impact to the passenger, responsive to said element estimating means, and for generating a signal to control said plurality of actuators to adjust said plurality of interior elements to said optimum position state during the collision.

2. An interior system as claimed in claim 1, wherein said microcomputer based control unit makes a computation upon said collision of the vehicle.

3. An interior system as claimed in claim 2, wherein said microcomputer based control unit makes said computation during the entirety of time in which the vehicle undergoes said collision, and in accordance with a time change during said collision.

4. An interior system as claimed in claim 1, wherein said plurality of interior elements include a three-point seat belt arrangement, a seat, an air bag, and a knee bolster.

5. An interior system as claimed in claim 1, wherein said plurality of actuators include an adjustable load clamp, a preloader, two explosive preloaders, a variable set pressure type pressure valve and ignition signal circuitry, and an adjustable orifice diameter damper.

6. An interior system as claimed in claim 1, wherein said first sensor means includes a laser radar.

7. An interior system as claimed in claim 1, wherein said second sensor means includes two telecameras, a seat weight detecting sensor, a seat back inclination detecting sensor, and a steering tilt amount detecting sensor.

8. An interior system as claimed in claim 7, wherein said second sensor further includes a knee bolster load detecting sensor, a shoulder belt tension detecting sensor, and a lap belt tension detecting sensor.

9. A method of controlling an interior system for absorbing an impact to a passenger in a vehicle, the interior system including a plurality of interior elements mounted to the vehicle, each having a state with respect to the passenger, a plurality of actuators for the plurality of interior elements, each adjusting the state of each of the plurality of interior elements, a plurality of first sensors mounted to the vehicle for detecting parameters of a collision of the vehicle, and a plurality of second sensors mounted to the vehicle for detecting a position of the passenger, the method comprising the steps of:
   visually detecting passenger position in real time before, during and after a collision;
   estimating movement of the passenger based upon said visual detection before, during and after the collision of the vehicle and;
   computing an optimum state of each of the plurality of interior elements to minimize the impact to the passenger upon and during the collision of the vehicle responsive to said movement estimating means, and generating a signal to adjust said plurality of actuators.

10. A method as claimed in claim 9, wherein said computing step is executed upon said collision of the vehicle.

11. A method as claimed in claim 10, wherein said computing step is executed during the entirety of time in which the vehicle undergoes the collision, and in accordance with time change in the collision.

* * * * *